US012614537B2

(12) United States Patent
Moritaka et al.

(10) Patent No.: US 12,614,537 B2
(45) Date of Patent: Apr. 28, 2026

(54) WEARABLE ACOUSTIC DEVICE, WEARABLE ACOUSTIC SYSTEM, AND ACOUSTIC PROCESSING METHOD

(71) Applicant: Yamaha Corporation, Hamamatsu (JP)

(72) Inventors: Toki Moritaka, Hamamatsu (JP); Yusuke Konagai, Hamamatsu (JP); Hideyoshi Masui, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 162 days.

(21) Appl. No.: 18/675,296

(22) Filed: May 28, 2024

(65) Prior Publication Data

US 2024/0404498 A1 Dec. 5, 2024

(30) Foreign Application Priority Data

May 31, 2023 (JP) ................................ 2023-089820

(51) Int. Cl.
*G10K 11/178* (2006.01)

(52) U.S. Cl.
CPC .. *G10K 11/17823* (2018.01); *G10K 11/17825* (2018.01); *G10K 11/17881* (2018.01); *G10K 2210/1081* (2013.01); *G10K 2210/3026* (2013.01); *G10K 2210/3027* (2013.01); *G10K 2210/3028* (2013.01); *G10K 2210/3056* (2013.01)

(58) Field of Classification Search
None
See application file for complete search history.

(56) References Cited

U.S. PATENT DOCUMENTS

| | | | | | |
|---|---|---|---|---|---|
| 4,985,925 | A * | 1/1991 | Langberg | G10K 11/17861 381/71.13 |
| 9,020,160 | B2 * | 4/2015 | Gauger, Jr. | G10K 11/17881 381/71.8 |
| 10,636,405 | B1 * | 4/2020 | Kemmerer | H04R 1/1008 |
| 10,950,213 | B1 * | 3/2021 | Lu | G10K 11/17881 |
| 11,189,261 | B1 * | 11/2021 | Lu | G10K 11/17881 |
| 12,356,163 | B1 * | 7/2025 | Shetye | H04R 1/24 |
| 2017/0148428 | A1 * | 5/2017 | Thuy | H04R 1/1083 |
| 2022/0084494 | A1 * | 3/2022 | Chen | G10K 11/17827 |
| 2023/0058427 | A1 * | 2/2023 | Pakarinen | G10K 11/17837 |
| 2024/0347035 | A1 * | 10/2024 | Itabashi | H04R 3/002 |

OTHER PUBLICATIONS

Product Features "The Importance of Hearing Protection", Crescendo, Korg Co., Ltd., Crescendo, Apr. 19, 2020, (5 pages).

* cited by examiner

*Primary Examiner* — Brian T Pendleton
(74) *Attorney, Agent, or Firm* — Crowell & Moring LLP

(57) ABSTRACT

A wearable acoustic device includes: a first microphone configured to collect external sound to acquire input sound; a second microphone configured to collect sound perceived by the ear in a state of the wearable acoustic device being worn on the ear of a user; a first processor configured to acoustically adjust the input sound using active noise control, based on the sound perceived by the ear collected by the second microphone, to acquire a first sound signal; a second processor configured to perform predetermined filter processing on the input sound, to acquire a second sound signal; a gain adjuster configured to adjust an attenuation amount characteristic of the sound perceived by the ear for a frequency to a predetermined characteristic and sound volume by combining the first sound signal and the second sound signal according to a level of the input sound.

8 Claims, 4 Drawing Sheets

WEARABLE ACOUSTIC DEVICE, WEARABLE ACOUSTIC SYSTEM, AND ACOUSTIC PROCESSING METHOD

CROSS-REFERENCE TO RELATED APPLICATIONS

The present application claims priority to Japanese Patent Application No. 2023-089820, filed May 31, 2023, the contents of which are incorporated herein by reference.

BACKGROUND

Technical Field

The present disclosure relates to a wearable acoustic device, a wearable acoustic system, and an acoustic processing method.

Background Art

In recent years, hearing impairment due to loud noise has become a concern. For instance, earplugs designed for hearing protection are known to be used in various events such as live performances, festivals, concerts, and other types of gatherings (for example, see Product Features|Crescendo", [online], Korg Co., Ltd., [searched on Apr. 19, 2020], Internet<URL: http://www.korg-kid.com/crescendo/feature/index.html>, hereinafter Non-Patent Document 1). The ear plugs disclosed in Non-Patent Document 1 protects a user's ears, using plugs with a special shape and material and a filter with fixed characteristics that is attached to the plug.

SUMMARY

However, in the aforementioned related art, adapting flexibly to external sounds was challenging due to the use of plugs with a special shape and material, and a filter with fixed characteristics based on its physical structure for reducing external sound volume.

One aspect of the present disclosure is a wearable acoustic device configured to be worn on an ear of a user, including: a first microphone configured to collect external sound to acquire input sound; a second microphone configured to collect sound perceived by the ear in a state of the wearable acoustic device being worn on the ear of the user, the sound perceived by the ear including output sound; a first processor configured to acoustically adjust the input sound using active noise control, based on the sound perceived by the ear collected by the second microphone, to acquire a first sound signal; a second processor configured to perform predetermined filter processing on the input sound, to acquire a second sound signal; a gain adjuster configured to adjust an attenuation amount characteristic of the sound perceived by the ear for a frequency to a predetermined characteristic and sound volume by combining the first sound signal and the second sound signal according to a level of the input sound, to acquire an adjusted sound signal; and a speaker configured to output the output sound that is based on the adjusted sound signal.

Moreover, another one aspect of the present disclosure is a wearable acoustic system, including: two wearable acoustic devices. Each of the two wearable acoustic devices includes: a first microphone configured to collect external sound to acquire input sound; a second microphone configured to collect sound perceived by the ear in a state of the wearable acoustic device being worn on the ear of the user, the sound perceived by the ear including output sound; a first processor configured to acoustically adjust the input sound using active noise control, based on the sound perceived by the ear collected by the second microphone, to acquire a first sound signal; a second processor configured to perform predetermined filter processing on the input sound, to acquire a second sound signal; a gain adjuster configured to adjust an attenuation amount characteristic of the sound perceived by the ear for a frequency to a predetermined characteristic and sound volume by combining the first sound signal and the second sound signal according to a level of the input sound, to acquire an adjusted sound signal; and a speaker configured to output the output sound that is based on the adjusted sound signal. A first of the two wearable acoustic devices is configured for a left ear, and a second of the two wearable acoustic devices is configured for a right ear. Each of the two wearable acoustic devices is configured to independently adjust a sound volume of the sound perceived by the ear.

Furthermore, a yet another aspect of the present disclosure is an acoustic processing method for a wearable acoustic device configured to be worn on an ear of a user. The method includes: collecting, by a first microphone of the wearable acoustic device, external sound to acquire input sound; collecting, by a second microphone of the wearable acoustic device, sound perceived by the ear in a state of the wearable acoustic device being worn on the ear of the user, the sound perceived by the ear including output sound; acoustically adjusting the input sound using active noise control, based on the sound perceived by the ear collected by the second microphone, to acquire a first sound signal; performing predetermined filter processing on the input sound, to acquire a second sound signal; adjusting an attenuation amount characteristic of the sound perceived by the ear for a frequency to a predetermined characteristic and sound volume by combining the first sound signal and the second sound signal according to a level of the input sound, to acquire an adjusted sound signal; and outputting the output sound that is based on the adjusted sound signal.

DETAILED DESCRIPTION OF THE INVENTION

Hereinafter, a wearable acoustic device, a wearable acoustic system, and an acoustic processing method according to embodiments of the present disclosure will be described, with reference to the drawings.

Figure 1:
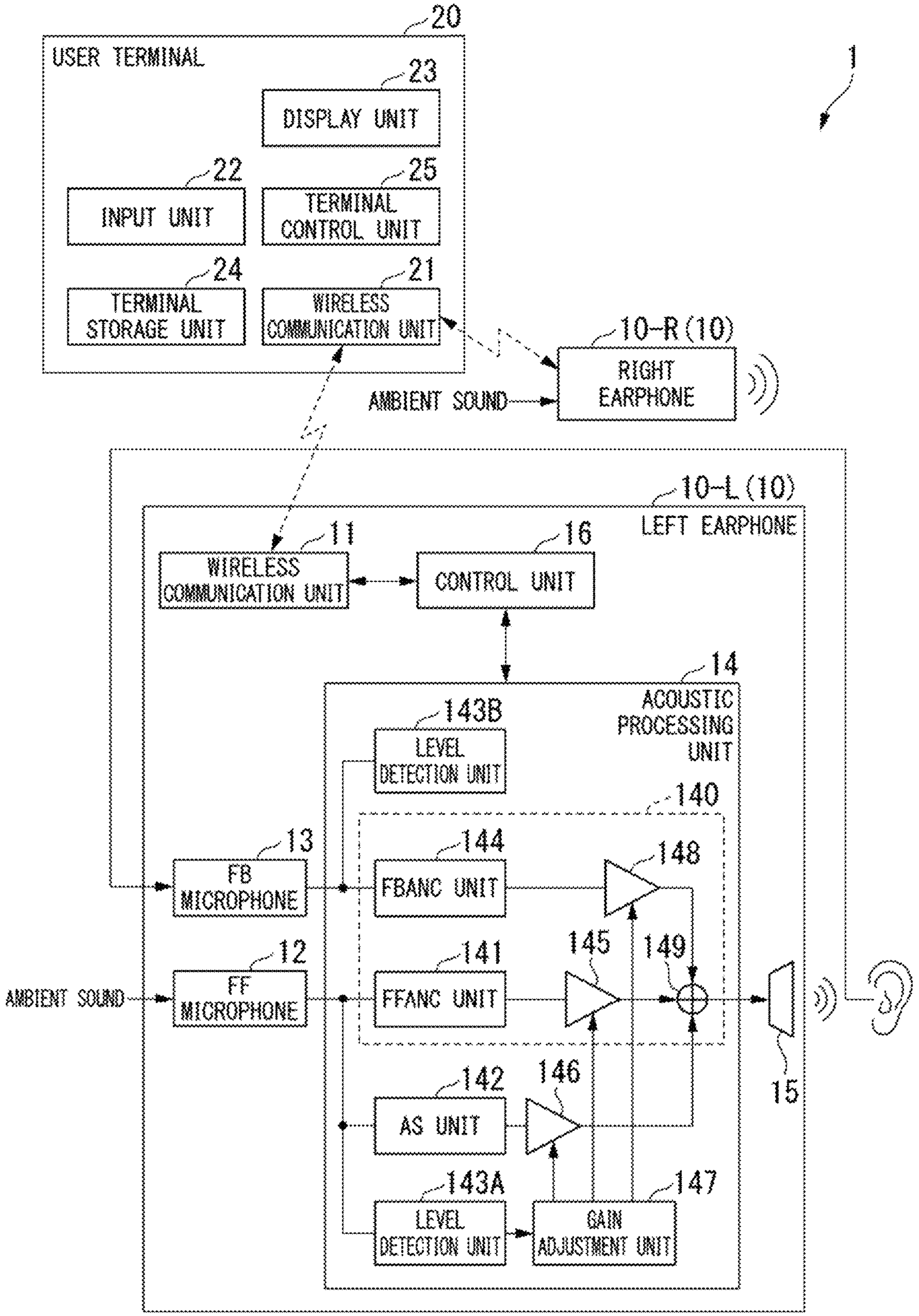
FIG. 1 is a block diagram showing an example of an acoustic system according to the present embodiment.

FIG. 1 is a block diagram showing an example of an acoustic system 1 according to the present embodiment.

As shown in FIG. 1, the acoustic system 1 includes a left earphone 10-L, a right earphone 10-R, and a user terminal 20.

The left earphone 10-L and the right earphone 10-R can be connected to the user terminal 20 by wireless communication. The left earphone 10-L and the right earphone 10-R have the same configuration, and will be described as wireless earphone 10 when referring to any earphone included in the acoustic system 1 or when there is no particular distinction between them.

In the present embodiment, the wireless earphones 10 (left earphone 10-L, right earphone 10-R) are an example of a wearable acoustic device. Moreover, the acoustic system 1 is an example of a wearable acoustic system.

The user terminal 20 (an example of a terminal device) is a terminal device that can communicate with the wireless earphones 10 (left earphone 10-L, right earphone 10-R), and is a device such as a smartphone, music player, personal computer, tablet terminal, or the like. The user terminal 20 is also a terminal device owned by a user, and performs various settings of the wireless earphones 10 (left earphone 10-L, right earphone 10-R) using, for example, a dedicated application.

Moreover, when the wireless earphones 10 (left earphone 10-L, right earphone 10-R) are used for listening to music, the user terminal 20 supplies music data to the wireless earphones 10 (left earphone 10-L, right earphone 10-R) and controls the output of the wireless earphones 10 (left earphone 10-L, right earphone 10-R).

The user terminal 20 includes a wireless communication unit 21, an input unit 22, a display unit 23, a terminal storage unit 24, and a terminal control unit 25.

The wireless communication unit 21 is, for example, a wireless communication device such as a Bluetooth (registered trademark) device, and communicates with the wireless earphones 10 (left earphone 10-L, right earphone 10-R) by wireless connection.

The input unit 22 is, for example, an input device such as a keyboard or a touch sensor, and accepts various input information from the user, and outputs the accepted various input information to the terminal control unit 25.

The display unit 23 is a display device such as a liquid crystal display. The display 20 unit 23 displays various information supplied from the terminal control unit 25. The display unit 23 displays, for example, the amount of acoustic exposure and the amount of attenuation (adjustment amount) of sound perceived by the ear, which will be described later.

The terminal storage unit 24 is, for example, a storage unit such as a RAM (Random Access Memory) or a flash memory. The terminal storage unit 24 stores various information used by the user terminal 20. The terminal storage unit 24 stores, for example, music data, a dedicated application program, setting information for the wireless earphones 10, and so forth.

The terminal control unit 25 is, for example, a processor including a CPU (Central Processing Unit), and controls the user terminal 20 in an integrated manner. The terminal control unit 25 executes various processes based on an Operating System (OS). Examples of the OS include iOS (registered trademark), Android (registered trademark), and Windows (registered trademark).

The terminal control unit 25 causes the CPU to execute a dedicated application program stored in the terminal storage unit 24 to thereby execute various setting processes of the wireless earphones 10. The terminal control unit 25 also causes the CPU to execute the program of an audio player application stored in the terminal storage unit 24 to thereby convert music data into sound signal playback data and transmit the converted music data to the wireless earphones 10 via the wireless communication unit 21.

Moreover, upon receiving the acoustic exposure amount and attenuation amount (adjustment amount) of the sound perceived by the ear via the wireless communication unit 21, the terminal control unit 25 causes the display unit 23 to display the acoustic exposure amount and the attenuation amount (adjustment amount) of the sound perceived by the ear.

The wireless earphones 10 (left earphone 10-L, right earphone 10-R) are earphones that can be worn on the user's ears, and enable the user to listen to sounds based on the playback data received from the user terminal 20. Furthermore, the wireless earphones 10 are capable of protecting the user's ear when worn on the user's ear at a concert venue, live performance venue, or the like by reducing the sound volume of ambient sound.

The wireless earphone 10 includes a wireless communication unit (transmitter) 11, a feedforward microphone (FF microphone) 12, a feedback microphone (FB microphone) 13, an acoustic processing unit 14, a speaker 15, and a control unit 16.

The wireless communication unit 11 is, for example, a wireless communication device such as a Bluetooth (registered trademark) device, and performs wireless communication with the user terminal 20. For example, the wireless communication unit 11 receives playback data from the user terminal 20 and outputs it to the control unit 16. Moreover, the wireless communication unit 11 transmits, for example, the acoustic exposure amount and the attenuation amount of a sound perceived by the ear, which will be described later, to the user terminal 20. In the present embodiment, the wireless communication unit 11 is an example of a communication processing unit, and transmits to the user terminal 20 at least one of the acoustic exposure amount and the attenuation amount of the sound perceived by the ear, which is the amount of adjustment of the sound perceived by the ear with respect to the level of the input sound.

The FF microphone 12 (an example of the first sound collection unit) is a microphone arranged at a position at which it can collect ambient sound, which is external sound and collects ambient sound. The FF microphone 12 supplies the collected sound signal to the acoustic processing unit 14 as the sound signal of the input sound.

The FB microphone 13 (an example of the second sound collection unit) is a microphone arranged at a position at which it can collect sound perceived by the ear when the wireless earphone 10 is worn on the user's ear. Here, the sound perceived by the ear is an example of the sound that can actually be heard when the wireless earphone 10 is worn on the user's ear. This includes output sound output (emitted) from the speaker 15, and ambient sound (ambient sound leakage) that leaks in when the wireless earphone 10 is worn on the user's ear. The FB microphone 13 supplies the collected sound signal to the acoustic processing unit 14 as the sound signal of the feedback sound.

The acoustic processing unit 14 executes predetermined acoustic processing, supplies the acoustically processed sound signal of the output sound to the speaker 15, and causes the speaker 15 to output the output sound. As the acoustic processing, the acoustic processing unit 14 adjusts the sound volume of the output sound so that it becomes a preliminarily set sound volume.

The acoustic processing unit 14 includes a feed forward active noise control (FFANC) unit 141, an ambient sound (AS) unit 142, a level detection unit 143A, a level detection unit 143B, a feed Back active noise control (FBANC) unit 144, amplifiers (145, 146, 148), a gain adjustment unit (gain adjuster) 147, and an adder 149.

The FFANC unit 141 performs filtering processing on the input sound (ambient sound) collected by the FF microphone 12, using a control technique called feedforward active noise control. Here, the filtering processing executed by the FFANC unit 141 is referred to as FFANC processing. The FFANC unit 141 supplies the output obtained through the execution of the FFANC processing to the amplifier 145.

The AS unit 142 (an example of the second processing unit) performs a predetermined filtering processing on the input sound (ambient sound) collected by the FF microphone 12, and captures the environmental sound (ambient sound). Here, the filtering processing executed by the AS unit 142 is referred to as AS processing. The AS unit 142 performs the filtering processing on the input sound so that the output sound becomes a predetermined frequency characteristic. The AS unit 142 supplies the output obtained through the execution of the AS processing to the amplifier 146.

The level detection unit 143A measures the level of the input sound collected by the FF microphone 12. The level detection unit 143A supplies the measured level of the input sound to the gain adjustment unit 147 and outputs it to the control unit 16. The level of the input sound measured by the level detection unit 143A is used for gain adjustment as well as for calculating the acoustic exposure amount.

The level detection unit 143B measures the level of the feedback sound collected by the FB microphone 13. The level detection unit 143B outputs the measured level of the feedback sound to the control unit 16. The level of the feedback sound measured by the level detection unit 143B is used for calculating the attenuation amount (adjustment amount) of the sound perceived by the ear.

The FBANC unit 144 performs filtering processing on the feedback sound collected by the FB microphone 13, using a control technique called feedback active noise control. Here, the filtering processing executed by the FBANC unit 144 is referred to as FBANC processing. The FBANC unit 144 supplies the output obtained through the execution of the FBANC processing to the amplifier 148.

The amplifier 145 is a gain-adjustable amplifier that amplifies or attenuates the output of the FFANC unit 141 according to a gain value specified through an instruction from the gain adjustment unit 147 and outputs the result to the adder 149. It should be noted that the concept of gain adjustment includes amplification and attenuation.

The amplifier 146 is a gain-adjustable amplifier, amplifies or attenuates the output of the AS unit 142 according to a gain value specified through an instruction from the gain adjustment unit 147 and outputs the result to the adder 149.

The amplifier 148 is a gain-adjustable amplifier that amplifies or attenuates the output of the FBANC unit 144 according to a gain value specified through an instruction from the gain adjustment unit 147 and outputs the result to the adder 149.

The adder 149 adds the output of the amplifier 145, the output of the amplifier 146, and the output of the amplifier 148 to generate a synthesized signal that combines the results of gain-adjusted FFANC processing, AS processing, and FBANC processing. The adder 149 outputs the synthesized signal to the speaker 15.

It should be noted that the FFANC unit 141 and the amplifier 145, the FBANC unit 144 and the amplifier 148, and a part of the adder 149 (the portion of adding the output of the amplifier 145 and the output of the amplifier 148) correspond to an ANC processing unit 140 (an example of the first processing unit (first processor)).

The ANC processing unit 140 uses active noise control to adjust the input sound collected by the FF microphone 12, based on the feedback sound collected by the FB microphone 13. The ANC processing unit 140 uses active noise control to properly suppress ambient sounds reaching the ear canal. It should be noted that the ANC processing unit 140 in the present embodiment combines feedforward active noise control and feedback active noise control.

The gain adjustment unit 147 adjusts the attenuation amount characteristic of the sound perceived by the ear for a frequency to a predetermined characteristic and sound volume by combining the output of the ANC processing unit 140 and the output of the FB microphone 13 according to the level of the input sound. Here, the predetermined characteristic is a flat characteristic that falls within the range of a predetermined attenuation amount. Based on the sound volume level of the ambient sound measured by the level detection unit 143A, the gain adjustment unit 147 calculates the gain that ensures the sound perceived by the ear becomes the predetermined sound volume and frequency characteristic (for example, a flat characteristic in the audible range), and adjusts the gains of the amplifier 145, the amplifier 146, and the amplifier 148, and the characteristic (not shown in the drawings) of the AS unit 142.

The gain adjustment unit 147 adjusts the sound volume of the output sound of the speaker 15 to a preliminarily set sound volume. For example, based on the level of the input sound, the gain adjustment unit 147 adjusts the sound volume of the output sound of the speaker 15 to the set sound volume when it exceeds the set sound volume.

The gain adjustment unit 147 adjusts the gains of the amplifiers 145, 146, and 148 according to the level of the input sound measured by the level detection unit 143A, to control the sound perceived by the user's ear at a safe sound volume.

The speaker 15 (an example of the output unit) outputs an output sound based on the sound signal adjusted by the gain adjustment unit 147.

The control unit 16 is, for example, a processor including a CPU, and controls the wireless earphones 10 in an integrated manner. The control unit 16 receives various setting information of the acoustic processing unit 14 from the user terminal 20, for example, via the wireless communication unit 11, and sets the various setting information in the acoustic processing unit 14.

Moreover, for example, as a function of normal wireless earphones, the control unit 16 receives playback data from the user terminal 20 via the wireless communication unit 11, and causes the speaker 15 to output sound based on the playback data.

Also, the control unit 16 causes the acoustic processing unit 14 to execute a process to adjust the gain so that the output sound becomes with the preliminarily specified sound volume, by capturing ambient sound when, for example, the live performance AS (Ambient Sound) function is turned on.

Furthermore, the control unit 16 calculates the acoustic exposure amount based on the level of the input sound (ambient sound) acquired from the acoustic processing unit 14, and transmits the calculated acoustic exposure amount to the user terminal 20 via the wireless communication unit 11. The control unit 16 may transmit a warning message along with an acoustic exposure amount when the acoustic exposure amount is equal to or greater than a threshold value.

Moreover, the control unit 16 calculates the adjustment amount (attenuation amount) of the sound perceived by the ear for the level of the input sound (ambient sound), for example, based on the level of the feedback sound (sound perceived by the ear) acquired from the level detection unit 143B, and transmits the calculated adjustment amount (attenuation amount) to the user terminal 20 via the wireless communication unit 11. The control unit 16 may transmit the level of the output sound attenuated from the input sound to the user terminal 20 instead of the adjustment amount (attenuation amount).

It should be noted that the acoustic system 1 according to the present embodiment includes two wireless earphones 10, one for each of the left and right ears (left earphone 10-L, right earphone 10-R). Each of the two wireless earphones 10 (left earphone 10-L, right earphone 10-R) independently adjusts the sound volume of the sound perceived by the ear.

Figure 2:
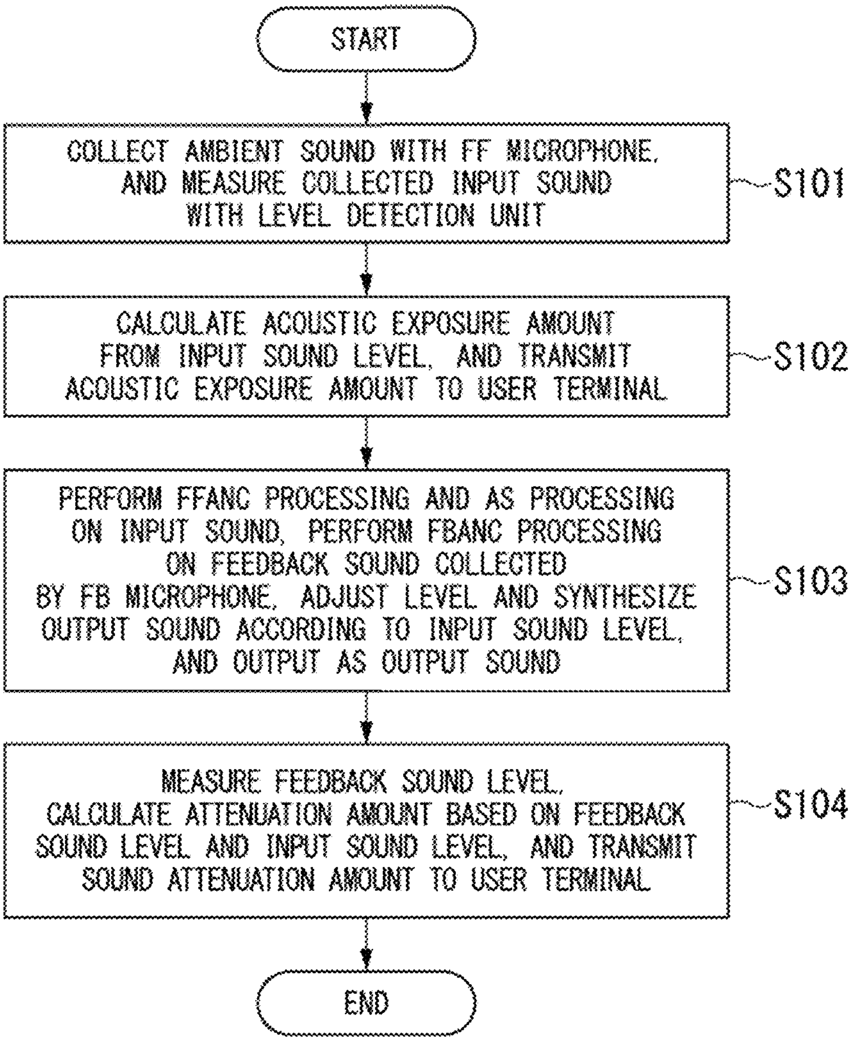
FIG. 2 is a flowchart showing an example of the operation of the acoustic system according to the present embodiment.

Next, the operation of the acoustic system 1 according to present embodiment will be described, with reference to the drawings. FIG. 2 is a flowchart showing an example of the operation of the acoustic system 1 according to the present embodiment. Here, the operation of the live performance AS function of the wireless earphone 10 of the acoustic system 1 will be described.

As shown in FIG. 2, in the wireless earphone 10 of the acoustic system 1, the FF microphone 12 first collects ambient sound, and the level detection unit 143A measures the level of the collected input sound (ambient sound) (Step S101). The level detection unit 143A outputs the measured level of the input sound to the control unit 16.

Next, the control unit 16 of the wireless earphone 10 calculates the acoustic exposure amount from the level of the input sound, and transmits the acoustic exposure amount to the user terminal 20 (Step S102). The control unit 16 transmits the acoustic exposure amount to the user terminal 20 by wireless communication via the wireless communication unit 11.

Next, the acoustic processing unit 14 of the wireless earphone 10 performs the FFANC processing and AS processing on the input sound and performs the FBANC processing on the feedback sound collected by the FB microphone 13, adjusts level of the sounds according to the input sound level and synthesizes the sounds, and outputs an output sound (Step S103). In the acoustic processing unit 14, the FFANC unit 141 performs the FFANC processing on the input sound, the AS unit 142 performs the AS processing on the input sound, and the FBANC unit 144 performs the FBANC processing on the feedback sound. The gain adjustment unit 147 of the acoustic processing unit 14 adjusts the sound volumes of the sounds to a preliminarily set sound volume (for example, 85 dB) according to the level of the input sound, and the adder 149 synthesizes the sounds and generates an output sound. As a result, the speaker 15 outputs the output sound that has been adjusted to the preliminarily set sound volume (for example, 85 dB) at the ear (ear canal). It should be noted that when the wireless earphone 10 is worn, the sound perceived by the ear is, for example, ambient sound at 85 dB, which is a combination of the output sound of the speaker 15 and the ambient sound leaking into the ear canal.

Next, the level detection unit 143B of the acoustic processing unit 14 measures the level of the feedback sound, and the control unit 16 calculates the attenuation amount based on the level of the feedback sound and the level of the input sound, and transmits the attenuation amount of the sound to the user terminal 20 (Step S104). The control unit 16 transmits the attenuation amount to the user terminal 20 by wireless communication via the wireless communication unit 11. After the process in Step S104, the control unit 16 ends the series of processes.

It should be noted that the wireless earphone 10 repeatedly executes the processes from Step S101 to Step S104 described above at regular intervals.

Next, with reference to FIG. 3, details of the above process of Step S103 performed by the acoustic processing unit 14 shown in FIG. 2 will be described.

Figure 3:
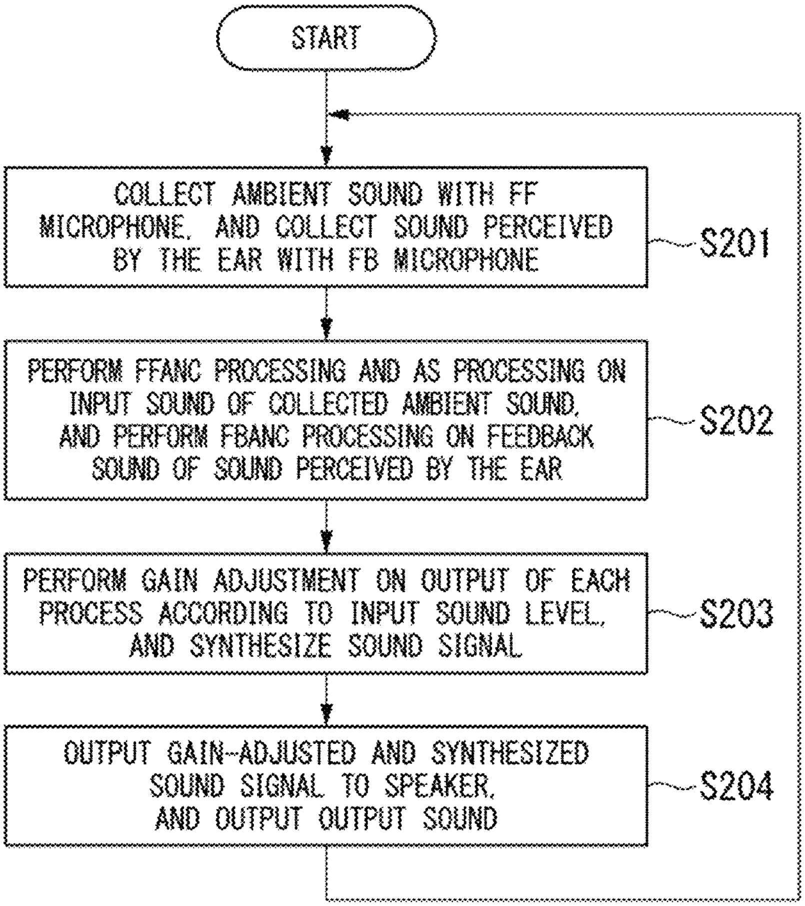
FIG. 3 is a flowchart showing an example of acoustic processing of the acoustic system according to the present embodiment.

FIG. 3 is a flowchart showing an example of acoustic processing of the acoustic system 1 according to the present embodiment.

As shown in FIG. 3, first, the FF microphone 12 of the wireless earphone 10 collects ambient sound, and the FB microphone 13 collects sound perceived by the ear (Step S201). It should be noted that the sound collected by the FB microphone 13 is the sum of the output sound of the speaker 15 and the leaked ambient sound multiplied by the transmission characteristic of the ear canal ((output sound+leaked ambient sound)×transmission characteristic of ear canal).

Next, the acoustic processing unit 14 performs the FFANC processing and the AS processing on the input sound, which is the collected ambient sound, and performs the FBANC processing on the feedback sound that has been collected as the sound perceived by the ear (Step S202). In other words, the FFANC unit 141 of the acoustic processing unit 14 performs the FFANC processing on the input sound and outputs it to the amplifier 145, and the AS unit 142 of the acoustic processing unit 14 performs the AS processing on the input sound and outputs it to the amplifier 146. Moreover, the FBANC unit 144 of the acoustic processing unit 14 performs the FFANC processing on the feedback sound and outputs it to the amplifier 148.

Next, the acoustic processing unit 14 synthesizes the outputs of each process by adjusting the gain according to the level of the input sound (Step S203). The gain adjustment unit 147 of the acoustic processing unit 14 performs gain adjustment of the amplifiers 145, 146, and 148 so that the sound perceived by the ear is adjusted to the preliminarily set sound volume according to the level of the input sound measured by the level detection unit 143A, and causes the adder 149 of the acoustic processing unit 14 to synthesize the sounds.

Next, the acoustic processing unit 14 outputs the gain-adjusted and synthesized sound signal to the speaker 15 to output an output sound (Step S204). The adder 149 outputs the adjusted sound signal (for example, a sound signal adjusted to 85 dB) to the speaker 15, and speaker 15 outputs the output sound to the user's ear. After the process of Step S204, the process returns to Step S201 and the acoustic processing unit 14 repeats the processes from Step S201 to Step S204.

Next, a method of acoustic control performed by the acoustic processing unit 14 will be described, with reference to FIG. 4.

Figure 4:
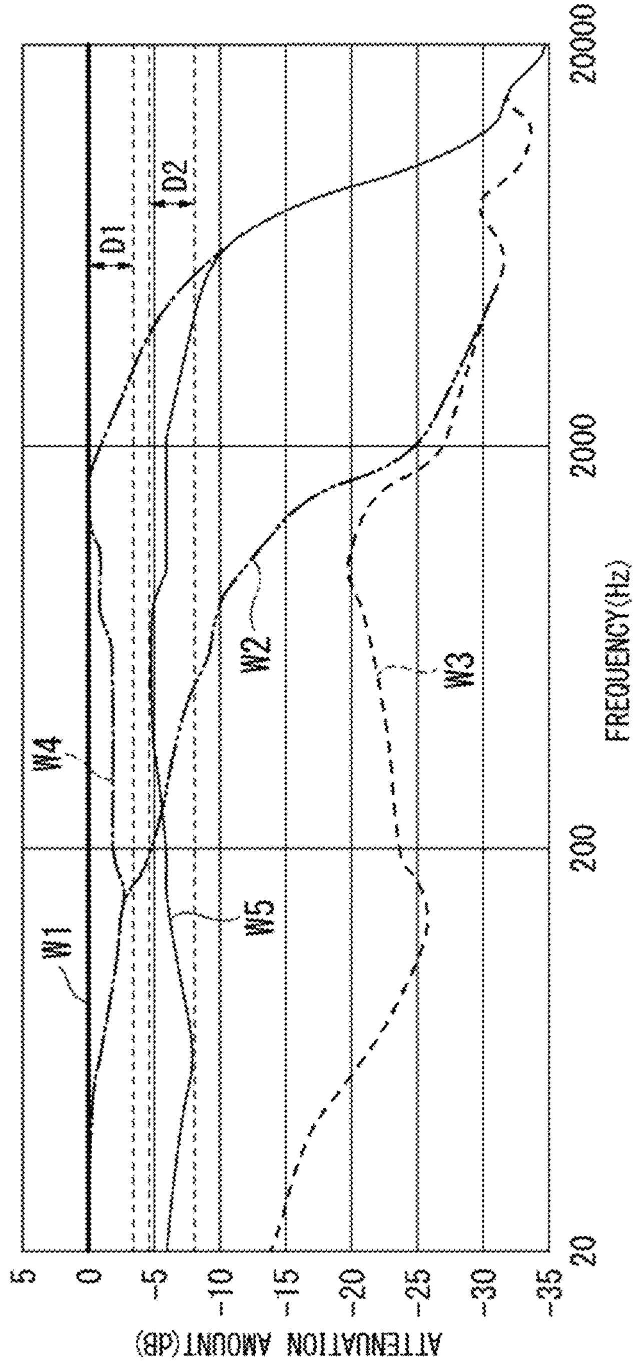
FIG. 4 is a diagram for describing an example of the acoustic processing of the acoustic system according to the present embodiment.

FIG. 4 is a diagram for describing an example of the acoustic processing of the acoustic system 1 according to the present embodiment.

In the graph shown in FIG. 4, the vertical axis represents attenuation amount (dB), and the horizontal axis represents frequency (Hz).

In FIG. 4, a waveform W1 indicates a waveform with a flat frequency characteristic of a reference sound volume.

Furthermore, a waveform W2 indicates acoustic sound insulation characteristics without electrical filtering processing when the wireless earphone 10 is worn on an ear. As shown with the waveform W2, the sound insulation characteristic of general earphones shows a tendency for attenuation to increase in high frequency regions. In other words, as it stands, the high-frequency range of sound would be cut off in concert halls or live performance venues.

Next, a waveform W3 shows a frequency characteristic when the ANC processing (FFANC processing+FBANC processing) of the ANC processing unit 140 is performed in addition to the acoustic sound insulation characteristic of the waveform W2. As shown with the waveform W3, the ANC processing unit 140 performs filtering processing to attenuate ambient sound including the low frequency range that cannot be sound insulated by the acoustic shown with the waveform W2.

Next, a waveform W4 shows a frequency characteristic when the AS processing of the AS unit 142 is performed in addition to the acoustic sound insulation characteristic of the waveform W2. As shown with the waveform W4, the AS unit 142 performs filtering processing to complement the acoustically insulated high frequency range of the waveform W2 and to obtain a flat characteristic (a characteristic that falls within a predetermined attenuation amount range D1).

Next, a waveform W5 shows a frequency characteristic in which gain is adjusted by combining the ANC processing (FFANC processing+FBANC processing) of the ANC processing unit 140 and the AS processing of the AS unit 142, in addition to the acoustic sound insulation characteristic of the waveform W2. The waveform W5 corresponds to the overall frequency characteristic imparted by the acoustic processing unit 14 of the present embodiment, and is appropriately attenuated to have a flat characteristic (a characteristic falling within a predetermined attenuation amount range D2).

As described above, the wireless earphone 10 (wearable acoustic device) according to the present embodiment is a wearable acoustic device that can be worn on the user's ear, and includes an FF microphone 12 (first sound collection unit), an FB microphone 13 (second sound collection unit), an ANC processing unit 140 (first processing unit), an AS unit 142 (second processing unit (second processor)), a gain adjustment unit 147, and a speaker 15 (output unit). The FF microphone 12 collects external sound (ambient sound). The FB microphone 13 collects sound that can actually be heard by the user's ear when worn on the user's ear. The ANC processing unit 140 uses active noise control to acoustically adjust the input sound collected by the FF microphone 12, based on the sound perceived by the ear and collected by the FB microphone 13. The AS unit 142 performs predetermined filtering processing on the input sound. The gain adjustment unit 147 adjusts the attenuation amount characteristic of the sound perceived by the ear for a frequency to a predetermined characteristic and sound volume by combining the output of the ANC processing unit 140 and the output of the FB microphone 13 according to the level of the input sound. The speaker 15 outputs an output sound based on the sound signal adjusted by the gain adjustment unit 147.

Thereby, the wireless earphone 10 (wearable acoustic device) according to the present embodiment combines the ANC processing unit 140 (first processing unit) and the AS unit 142 (second processing unit) to adjust the attenuation amount of the sound perceived by the ear to a predetermined characteristic (for example, a flat characteristic) and adjust (reduce) the sound volume of the sound perceived by the ear, thus ensuring proper protection of a user's ear while allowing for listening to external sound. In other words, the wireless earphone 10 of the present embodiment can properly protect a user's ear while allowing for listening to external sound at an appropriate sound volume and tone, according to the external sound.

Moreover, the wireless earphone 10 according to the present embodiment includes a wireless communication unit 11 (communication processing unit) that transmits to the user terminal 20 (terminal device) capable of communicating with the wireless earphone 10 at least one of the acoustic exposure amount based on the level of an input sound, and the adjustment amount (attenuation amount) of the sound perceived by the ear based on the level of the input sound.

Thereby, the wireless earphone 10 according to the present embodiment transmits to the user terminal 20 (terminal device) at least one of the acoustic exposure amount and the adjustment amount (attenuation amount) of sound perceived by the ear, and therefore, this information can be notified to the user, using the user terminal 20, thus increasing the user's awareness of ear protection.

In the wireless earphone 10 according to the present embodiment, for example, while wearing the wireless earphone 10, the user can receive a warning indicating that the ambient sound exposure level is at an unsafe level (for example, 110 dBSPL). Moreover, with the live performance AS function turned ON, the user can use the user terminal 20 to learn the sound volume reduction effect (the attenuation amount of the sound perceived by the user's ear).

It should be noted that the wireless earphones 10 according to the present embodiment can be used as regular wireless earphones to listen to music while traveling to a concert venue or live performance venue, and allow the user to listen to loud performance at a sound volume that has been reduced to a safe level while wearing them upon entering the concert venue or live performance venue.

Moreover, in the present embodiment, the gain adjustment unit 147 adjusts the sound volume of output sound, ensuring that the sound perceived by the ear becomes a preliminarily set sound volume.

Thereby, the wireless earphone 10 of the present embodiment can flexibly set the sound volume of the output sound to suit the user's preference, and can properly protect the user's ear.

Moreover, in the present embodiment, the gain adjustment unit 147 adjusts the sound volume of the output sound, ensuring that the sound perceived by the ear becomes the set sound volume when the sound perceived by the ear exceeds the set sound volume.

Thus, the wireless earphone 10 of the present embodiment adjusts the sound volume of the output sound, ensuring that the sound perceived by the ear aligns with the set sound volume when the set sound volume is exceeded, thus automatically ensuring proper protection of the user's ear.

Moreover, in the present embodiment, the ANC processing unit 140 includes: the FFANC unit 141 that performs filtering processing using a control technique called feedforward active noise control; and the FBANC unit 144 that performs filtering processing using a control technique called feedback active noise control. The ANC processing unit 140 combines feedforward active noise control and feedback active noise control to perform filtering processing.

As a result, the wireless earphone 10 according to the present embodiment can perform more appropriate ANC processing by combining the two types of controls, thus effortlessly realizing a flat frequency characteristic for sound perceived by the ear.

Moreover, the acoustic system 1 (wearable acoustic system) according to the present embodiment includes two of the wireless earphones 10 described above, one for each of the left and right ears (left earphone 10-L, right earphone 10-R). Each of the two wireless earphones 10 (left earphone 10-L, right earphone 10-R) independently adjusts the sound volume of the sound perceived by the ear.

As a result, the acoustic system 1 (wearable acoustic system) according to the present embodiment achieves the same effects as the wireless earphone 10 described above, and can properly protect the user's ear while allowing for listening to external sound at an appropriate sound volume and tone.

Furthermore, when the wireless earphones 10 are worn on the left and right ears, the levels of the left and right ambient sounds (input sounds) may differ depending on the orientation of the user's body and the positional relationship with the sound source. In such a case, in the acoustic system 1 according to the present embodiment, since each of the two wireless earphones 10 (left earphone 10-L, right earphone 10-R) independently adjusts the sound volume of the sound perceived by the ear, the user can listen to sound at the same volume with both left and right ears. That is to say, the acoustic system 1 according to the present embodiment allows the user to listen with the same frequency characteristic and at the same volume on the left and right sides, regardless of the standing position.

Furthermore, the acoustic processing method according to the present embodiment is an acoustic processing method for the wireless earphone 10 that can be worn on user's ear, including the FF microphone 12 that collects external sound (ambient sound), and the FB microphone 13 that collects sound perceived by the ear, including output sound, when worn on the user's ear. The method includes the first processing step, the second processing step, the gain adjustment step, and the output step. In the first processing step, the ANC processing unit 140 uses active noise control to acoustically adjust the input sound collected by the FF microphone 12, based on the sound perceived by the ear and collected by the FB microphone 13. In the second processing step, the AS unit 142 performs the predetermined filtering processing on the input sound. In the gain adjustment step, the gain adjustment unit 147 adjusts the attenuation amount characteristic of the sound perceived by the ear for a frequency to a predetermined characteristic and sound volume by combining the output of the ANC processing unit 140 and the output of the FB microphone 13 according to the level of the input sound. In the output step, the speaker 15 outputs an output sound based on the sound signal adjusted by the gain adjustment unit 147.

As a result, the acoustic processing method according to the present embodiment achieves the same effects as the wireless earphone 10 described above, and enables proper protection of the user's ear while allowing for listening to external sound at an appropriate sound volume and tone.

It should be noted that the present disclosure is not limited to the above embodiment, and modifications may be made without departing from the scope of the disclosure.

For example, in the above embodiment, an example of the wireless earphone 10 has been described as an example of the wearable acoustic device, however, the disclosure is not limited to this example, and the present disclosure can be applied to other wearable acoustic devices such as headphones.

Moreover, in the above embodiment, an example has been described in which the wireless earphone 10 communicates with the user terminal 20 through wireless communication, however, the wireless earphone 10 is not limited to this example, and may communicate through wired communication.

Moreover, in the above embodiment, an example of communication between the wireless earphone 10 and the user terminal 20 using Bluetooth (registered trademark) has been described, however, the present disclosure is not limited to this example, and other wireless communication such as 2.4 GHz wireless communication may be used.

Moreover, in the above embodiment, the ANC processing unit 140 may perform acoustic adjustment by adjusting the computational amount for each of multiple divided frequency bands, ensuring that the attenuation amount characteristic of the sound perceived by the ear become the predetermined characteristic. Also, the AS unit 142 may perform filtering processing on the input sound for each of multiple divided frequency bands, ensuring that the attenuation amount characteristic of the sound perceived by the ear for the frequency aligns with the predetermined characteristic. Here, the predetermined characteristic is a flat characteristic that falls within the range of a predetermined attenuation amount.

As a result, the wireless earphone 10 according to the present embodiment performs processing for each of multiple divided frequency bands in the ANC processing unit 140 and the AS unit 142, thereby easily realizing a predetermined characteristic (flat characteristics) of sound perceived by the ear with respect to frequency. Furthermore, the wireless earphone 10 according to the present embodiment processes input sound so that the attenuation amount of a sound perceived by the ear with respect to frequency has a flat characteristic, thereby allowing for listening to high-quality sound of concerts or live performances without loss in sound quality while ensuring proper protection of the user's ear.

Moreover, in the above embodiment, an example has been described in which the control unit 16 calculates the adjustment amount (attenuation amount) of the sound perceived by the ear for the level of the input sound (ambient sound), based on the level of the feedback sound (sound perceived by the ear) acquired from the level detection unit 143B and the level of input sound (ambient sound). However, the disclosure is not limited to this example. The control unit 16 may calculate the adjustment amount (attenuation amount) of the sound perceived by the ear relative to the level of the input sound (ambient sound), based on the level of the input sound (ambient sound) acquired from the level detection unit 143A and the preliminarily set sound volume.

Moreover, in the above embodiment, the control unit 16 may transmit to the user terminal 20 the value of the sound perceived by the ear that is the level of the feedback sound (sound perceived by the ear) acquired from the level detection unit 143B.

It should be noted that each configuration included in the acoustic system 1 described above includes a computer system therein. A program for implementing the function of each configuration included in the acoustic system 1 described above may be recorded on a computer-readable recording medium, and the processing of each configuration included in the above acoustic system 1 may be performed by loading the program recorded on the recording medium into a computer system and executing it. Here, "loading a program recorded on a recording medium into a computer system and executing it" includes installing the program on a computer system. It should be noted that the "computer system" herein includes an operating system and hardware units such as peripheral devices.

Also, the "computer system" may include a plurality of computer devices connected via a network including the Internet, a WAN, a LAN, and a communication line such as a dedicated line. Moreover, the "computer-readable recording medium" here refers to a portable medium such as a flexible disk, a magnetic optical disk, a ROM, and a CD-ROM, or a memory storage device such as a hard disk built in a computer system. Thus, the recording medium storing the program may be a non-transitory recording medium such as a CD-ROM.

The recording medium also includes a recording medium provided internally or externally that can be accessed from a distribution server for distributing the program. It should be noted that the program may be divided into a plurality of parts, downloaded at different timings, and then combined in each configuration included in the acoustic system 1, or the distribution servers that distribute each part of the divided programs may be different. Furthermore, the "computer-readable recording medium" may refer to those that store programs for a certain period of time, such as a volatile memory (RAM) inside a computer system serving as a server or a client where the program is transmitted via a network. Moreover, the above program may be for realizing a part of the functions described above. Furthermore, the above program may be a so-called difference file (difference program) that enables implementation of the functions described above in combination with a program already recorded in a computer system.

Also, some or all of the functions described above may be realized as an integrated circuit such as an LSI (Large Scale Integration). Each of the functions described above may be implemented as an individual processor, or a part or all of them may be integrated into a processor. Moreover, the method of circuit integration is not limited to LSI, but may be implemented using a dedicated circuit or a general-purpose processor. Furthermore, if an integrated circuit technology that replaces LSI emerges due to advances in semiconductor technology, an integrated circuit based on such a technology may be used.

According to the present disclosure, it is possible to ensure proper protection of a user's ears while allowing for listening to external sound at an appropriate sound volume and tone, according to the external sound.

What is claimed is:

1. A wearable acoustic device configured to be worn on an ear of a user, comprising:

a first microphone configured to collect external sound to acquire input sound;

a second microphone configured to collect sound perceived by the ear in a state of the wearable acoustic device being worn on the ear of the user, the sound perceived by the ear including output sound;

a first processor configured to acoustically adjust the input sound using active noise control, based on the sound perceived by the ear collected by the second microphone, to acquire a first sound signal;

a second processor configured to perform predetermined filter processing on the input sound, to acquire a second sound signal;

a gain adjuster configured to adjust an attenuation amount characteristic of the sound perceived by the ear for a frequency to a predetermined characteristic and sound volume by combining the first sound signal and the second sound signal according to a level of the input sound, to acquire an adjusted sound signal; and a speaker configured to output the output sound that is based on the adjusted sound signal.

2. The wearable acoustic device according to claim 1, wherein the first processor is configured to perform acoustic adjustment for each of a plurality of divided frequency bands so that the attenuation amount characteristic of the sound perceived by the ear becomes the predetermined characteristic, and wherein the second processor is configured to perform filtering processing on the input sound for each of the plurality of divided frequency bands so that the attenuation amount characteristic of the sound perceived by the ear becomes the predetermined characteristic.

3. The wearable acoustic device according to claim 1, further comprising:

a transmitter configured transmit to a terminal device capable of communicating with the wearable acoustic device, at least one of an acoustic exposure amount based on a level of the input sound or an adjustment amount of the sound perceived by the ear with respect to the level of the input sound.

4. The wearable acoustic device according to claim 1, wherein the gain adjuster is configured to adjust a sound volume of the output sound so that that the sound perceived by the ear becomes a preliminarily set sound volume.

5. The wearable acoustic device according to claim 4, wherein the gain adjuster is configured to adjust the sound volume of the output sound so that the sound perceived by the ear becomes the preliminary set sound volume when the sound perceived by the ear exceeds the preliminarily set sound volume.

6. The wearable acoustic device according to claim 1, wherein the predetermined characteristic is a flat characteristic that falls within a range of a predetermined attenuation amount.

7. A wearable acoustic system, comprising:

two wearable acoustic devices, each of the two wearable acoustic devices comprising:

a first microphone configured to collect external sound to acquire input sound;

a second microphone configured to collect sound perceived by the ear in a state of the wearable acoustic device being worn on the ear of the user, the sound perceived by the ear including output sound;

a first processor configured to acoustically adjust the input sound using active noise control, based on the sound perceived by the ear collected by the second microphone, to acquire a first sound signal;

a second processor configured to perform predetermined filter processing on the input sound, to acquire a second sound signal;

a gain adjuster configured to adjust an attenuation amount characteristic of the sound perceived by the ear for a frequency to a predetermined characteristic and sound volume by combining the first sound signal and the second sound signal according to a level of the input sound, to acquire an adjusted sound signal; and a speaker configured to output the output sound that is based on the adjusted sound signal;

wherein a first of the two wearable acoustic devices is configured for a left ear, and a second of the two wearable acoustic devices is configured for a right ear, and wherein each of the two wearable acoustic devices is configured to independently adjust a sound volume of the sound perceived by the ear.

8. An acoustic processing method for a wearable acoustic device configured to be worn on an ear of a user, comprising:

collecting, by a first microphone of the wearable acoustic device, external sound to acquire input sound;

collecting, by a second microphone of the wearable acoustic device, sound perceived by the ear in a state of the wearable acoustic device being worn on the ear of the user, the sound perceived by the ear including output sound;

acoustically adjusting the input sound using active noise control, based on the sound perceived by the ear collected by the second microphone, to acquire a first sound signal;

performing predetermined filter processing on the input sound, to acquire a second sound signal;

adjusting an attenuation amount characteristic of the sound perceived by the car for a frequency to a predetermined characteristic and sound volume by combining the first sound signal and the second sound signal according to a level of the input sound, to acquire an adjusted sound signal; and outputting the output sound that is based on the adjusted sound signal.

* * * * *